(12) United States Patent
Li et al.

(10) Patent No.: US 8,312,316 B2
(45) Date of Patent: Nov. 13, 2012

(54) DATA STORAGE SYSTEM, METHOD AND DATA STORAGE AND BACKUP SYSTEM

(75) Inventors: Tak Ho Alex Li, Cheung Sha Wan (HK);
Ping Shum, Cheung Sha Wan (HK);
Jiajie Zheng, Guangzhou (CN); Kwun Hok Chan, Cheung Sha Wan (HK)

(73) Assignee: BizCON Solutions Limited, Cheung Sha Wan (HK)

( * ) Notice: Subject to any disclaimer, the term of this patent is extended or adjusted under 35 U.S.C. 154(b) by 78 days.

(21) Appl. No.: 12/476,090

(22) Filed: Jun. 1, 2009

(65) Prior Publication Data

US 2010/0153774 A1     Jun. 17, 2010

(30) Foreign Application Priority Data

Dec. 12, 2008 (CN) .......................... 2008 1 0186708

(51) Int. Cl.
*G06F 11/00* (2006.01)
(52) U.S. Cl. ........................................ 714/6.23; 714/6.2
(58) Field of Classification Search .............. 714/6, 6.23
See application file for complete search history.

(56) References Cited

U.S. PATENT DOCUMENTS

2005/0132157 A1*   6/2005   Maeda et al. ................. 711/162
2008/0082591 A1*   4/2008   Ahal et al. .................... 707/204

* cited by examiner

*Primary Examiner* — Scott Baderman
*Assistant Examiner* — Jigar Patel
(74) *Attorney, Agent, or Firm* — J.C. Patents

(57) ABSTRACT

A data storage system, method and a data storage and backup system are provided. The data storage method comprises defining a local storage of the data processing system as a journal vault; storing data in the journal vault by journaling; sending the data from the journal vault to a transmitter; and transmitting the data from the transmitter to a secondary storage. The present invention enhances a write function of a low performance storage device by journaling. In a case where the present invention is applied to a backup system, the performance of the whole backup system can be improved significantly, and the backup system can be extended to a remote site easily. When a storage of a production system fails, the storage system of the present invention can be switched to "production mode" and service resumes to be provided with the shortest downtime.

24 Claims, 5 Drawing Sheets

DATA STORAGE SYSTEM, METHOD AND DATA STORAGE AND BACKUP SYSTEM

CROSS-REFERENCE TO RELATED APPLICATIONS

The application claims the priority benefits of Chinese Patent Application No. 200810186708.5 filed on Dec. 12, 2008, the contents of which are hereby incorporated by reference in its entirety.

FIELD OF THE INVENTION

The present invention generally relates to a data storage system, and more particularly, relates to a write enhanced data storage system, a data storage method, and a data storage and backup system.

DESCRIPTION OF THE RELATED ART

In general, data backup is performed by use of various storage mediums, such as magnetic tape, magnetic disk or the like. For example, in a backup by means of magnetic disks, generally a magnetic disk used for the backup is disposed in separate system, and data is communicated through networks such as IP, iSCSI, optical fiber and so on. For a general use, the performance of the magnetic disk used for the backup is generally lower than the performance of the magnetic disk in a host computer. For example, a production system might adopt a SAS magnetic disk, and in contrast a backup system might adopt a SATA magnetic disk. Therefore, if a mirrored backup is used, due to the low performance of the magnetic disk for the backup, the efficiency of the mirror will be low, and correspondingly the resource of the production system will be affected. However, in a production circumstance, system resource is very important for a production sever. Thus it should be avoided that the system resource is occupied by a process which does not belong to the production service itself. On the other hand, if a storage device of a backup system is of the same speed and the same level as that of a production system, for example both are SAS magnetic disks, although the speed is increased, the cost of the backup system becomes expensive. Further more, if a backup in a remote copying manner is adopted, the backup window will be relatively long, resulting in that the index for indicating the amount of data loss becomes large, and data protection is not so perfect.

SUMMARY OF THE INVENTION

In order to solve the above mentioned problems, the present invention aims to provide an enhanced low performance storage system.

According to one aspect of the present invention, there is provided a data storage method for a data processing system, comprising: defining a local storage of the data processing system as a journal vault; storing data in the journal vault by journaling; sending the data from the journal vault to a transmitter; and transmitting the data from the transmitter to a secondary storage.

According to another aspect of the present invention, there is provided a data storage system for a data processing system, comprising: a journal vault, which is a local storage of the data processing system, and stores data by journaling; a transmitter for receiving the data from the journal vault; and a secondary storage for receiving and storing the data transmitted from the transmitter.

According to another aspect of the present invention, there is provided a data storage system, comprising: a production system including a first storage; a backup system including a secondary storage, a mirror relationship between the first storage and the secondary storage being established for a backup, the backup system further comprising: a journal vault, which is a local storage of the data processing system, and stores data by journaling at the time when the data is written into the first storage; and a transmitter for receiving the data from the journal vault; and wherein the secondary storage receives and stores the data transmitted from the transmitter as the backup of the first storage.

By the journaling mechanism and the added local storage, the present invention enhances the write function of a low performance storage device.

Further, in a case where the present invention is applied to a backup system, since the writing performance of the storage system is enhanced and writing operations occupies most work time of the backup system, the performance of the whole backup system can be improved significantly. Also, the backup system can be extended to a remote site by simple deployment and setup. Also, in case a storage of a production system fails, the storage system of the present invention can be switched to "production mode" and service resumes to be provided with the shortest downtime.

BRIEF DESCRIPTION OF THE DRAWINGS

The above and other aspects, features and advantages of the present invention will be better understood by those skilled in the art from the detailed description of the embodiments of the invention in conjunction with the accompanying drawings. In the accompanying drawings, the same or similar reference number indicates the same or similar component, wherein.

DESCRIPTION OF PREFERRED EMBODIMENTS

The specific embodiments of the present invention will be described below with reference to the accompanying drawings. If considering the detailed description of some prior art might blur the main points of the present invention, the detailed description thereof is not provided herewith. And the invention comprises, but is not limited to, the instances explained in all the examples below.

In the following description, the terminology of "low performance" regarding storage medium is relative to another terminology "high performance". The relationship between the terms of "low" and "high" should be comprehended in relative meaning with respect to each other, instead of absolute meaning. In general, performance of a storage device used for a backup system is lower than that of a production system. For example, a production system uses a SAS hard disk and a backup system uses a SATA hard disk. It is also possible that a backup system uses a device the performance of which is comparable to or higher than that of a production system. However, generally speaking, performance of a storage device of a backup system is lower than that of a production system. Likewise, the terms of "low" and "high" usually mean to be relative when applied to describe the performance, because it is difficult to give an absolute definition for the terms of "low" and "high" due to the characteristic that performance of various storage mediums keep improved increasingly. However, it does not means a lot for the present invention, because such performance improvement is for all various storage mediums, and a storage medium with high performance will continue to maintain its advantage with respect to a storage medium with low performance.

Also, a first storage and a secondary storage are relative conceptions. As well known in the art, a first storage usually refers to a storage system local in a data processing system, and a secondary storage usually refers to a remote storage system, but it can also be a storage system local in a data processing system. Further, a first storage usually adopts a high performance storage medium, and serves as the storage of a production system. In contrast, a secondary storage usually adopts a relatively low performance storage medium, and serves as the storage of a backup system. Moreover, when a first storage fails, data can be directly written into and read out from a secondary storage, and in this regard the secondary storage becomes a first storage.

Furthermore, in present specification, sometimes, we use the expression that "applying" a journal to a secondary storage, and "applying" here includes transmitting a journal to a secondary storage, and writing, for example according to a recorded position L and content C, the content C into the position L.

Firstly, a data storage system according to one embodiment of present invention will be described below.

Figure 1:
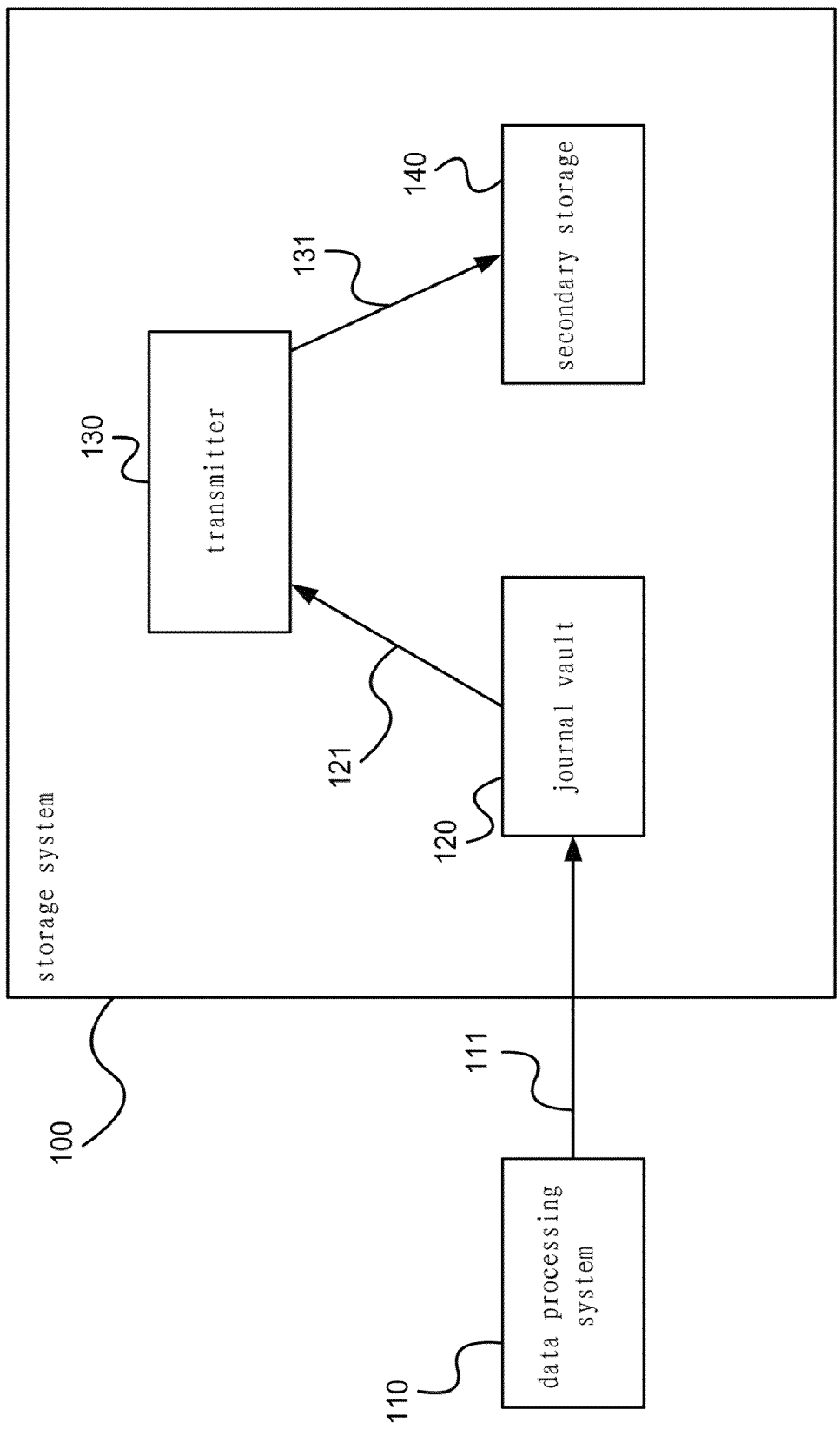
FIG. 1 is a block diagram showing a data storage system according to one embodiment of the present invention.

FIG. 1 is a block diagram showing a data storage system 100 according to one embodiment of the present invention. The data storage system 100 comprises: a journal vault 120, which is a local storage of the data processing system 110, and stores data by journaling; a transmitter 130 for receiving a journal from the journal vault 120; and a secondary storage 140 for receiving and storing the data transmitted form the transmitter 130.

The data processing system 110 here can be implemented by a desktop computer, a portable computer, a workstation or the like. In the sense of network, it can be a client, a server, or both of them at the same time.

The journal vault 120 is a local storage of the data processing system 110. The local storage includes all storage devices that can be accessed directly by an operation system of the data processing system, such as a USB disk, floppy disk, solid state magnetic disk, complex flash disk, locally connected hard disk, external hard disk, remote magnetic disc, memory space or the like. Moreover, the local storage used as the journal vault can be a storage newly added into the data processing system, or can be the existing or virtual storage in the data processing system. Preferably, a newly added local storage is used as the journal vault.

The data processing system 110 is connected with the journal vault 120 (as indicated by arrow 111). As to the connection manner, it can be the manner of a directly connected USB flash driver, local hard disk driver, RAM Disk (memory simulating magnetic disk) or the like, or it also can be the manner of connecting through fiber channel, SATA, SAS, SCSI, iSCSI, IP and so on, as long as the operation system of the data processing system can directly access the journal vault in a manner of local storage. The data of the data processing system is written into the journal vault 120 by a drive in the manner of journaling. Since the journal vault 120 uses a local storage as a storage device, the writing speed can be ensured. Also, since it is written directly by journaling, the writing operation does not spend the disk tracking time. Also, in the journaling manner, the volume of data is small and the transmission thereof is faster than that of the complete data, thus the writing operation performance of the data processing system 110 is enhanced.

The journal referred herein includes all journal manners that can record the writing of disk data, for example, including but not limited to, encryption/decryption, non-deduplicate/deduplicate, simple direct manner/indirect manner, and records at least the position and content in a manner of "sequential/non sequential". The content of a journal records at least the position where the data is written and the content thereof, and other contents to be recorded include but are not limited to date, time and the contents before changed.

The transmitter 130 is an intermediate component between the journal vault 120 and the secondary storage 140. After the journal is written into the journal vault 120, the transmitter 130 will read out the journal according to a predefined time policy (as indicated by arrow 121). The transmitter 130 can be implemented by software, hardware, firmware or the combination thereof, as long as it can implement the functions of receiving a journal, transmitting a journal, and applying a journal to the secondary storage. The transmitter 130 can be a component located inside the data processing system 110, a component located in another data processing system, or an independent hardware. When implemented in hardware, the transmitter 130 can be connected with the journal vault 130 through a fiber channel, SATA, SAS, iSCSI, IP or the like. Alternatively, the transmitter can be implemented in software, and then the transmitter 130 can be a program process which can be run in the data processing system 110 or other systems, only on condition that it can receive, transmit and apply the journal to the secondary storage. In addition, in the operating of the journal by the transmitter 130, the transmitter 130 can perform the functions of data compression, data encryption and deleting of duplicate data, that is, only retaining the journal that is sufficient to generate the final state of current data.

The transmitter 130 can apply the journal to the secondary storage 140 (as indicated by arrow 131) according to a predefined time policy, for example, continuously or periodically, so as to form the final storage of the data.

In addition, since the capacity of a journal vault is limited, the transmitter 130 can delete the journal in the journal vault that has been applied to the low performance secondary storage 140 periodically or aperiodically according to a predefined policy.

The secondary storage 140 is generally a low performance storage medium with respect to the first storage of the data processing system 110. The secondary storage 140 can be, for example but not limited thereto, a SATA magnetic disk, magnetic tape, magnetic disc and so on. Alternatively, it may also be a storage medium the performance of which is comparable to or in a special situation higher than that of the first storage. The secondary storage 140 can be local in the data processing system 110, but also can be at a remote location. Also, the secondary storage 140 can also support a snapshot function by using the characteristic of the storage itself, thereby obtaining multiple versions of a data image. Thereafter, the data processing system, when requires data, will read the data from the secondary storage 140. In general, since the performance of the secondary storage 140 is relatively low, the storage system 100 forms a low performance storage system as a whole. However, the function of writing operation to the storage system 100 by the data processing system 110 is enhanced by journaling.

Figure 2:
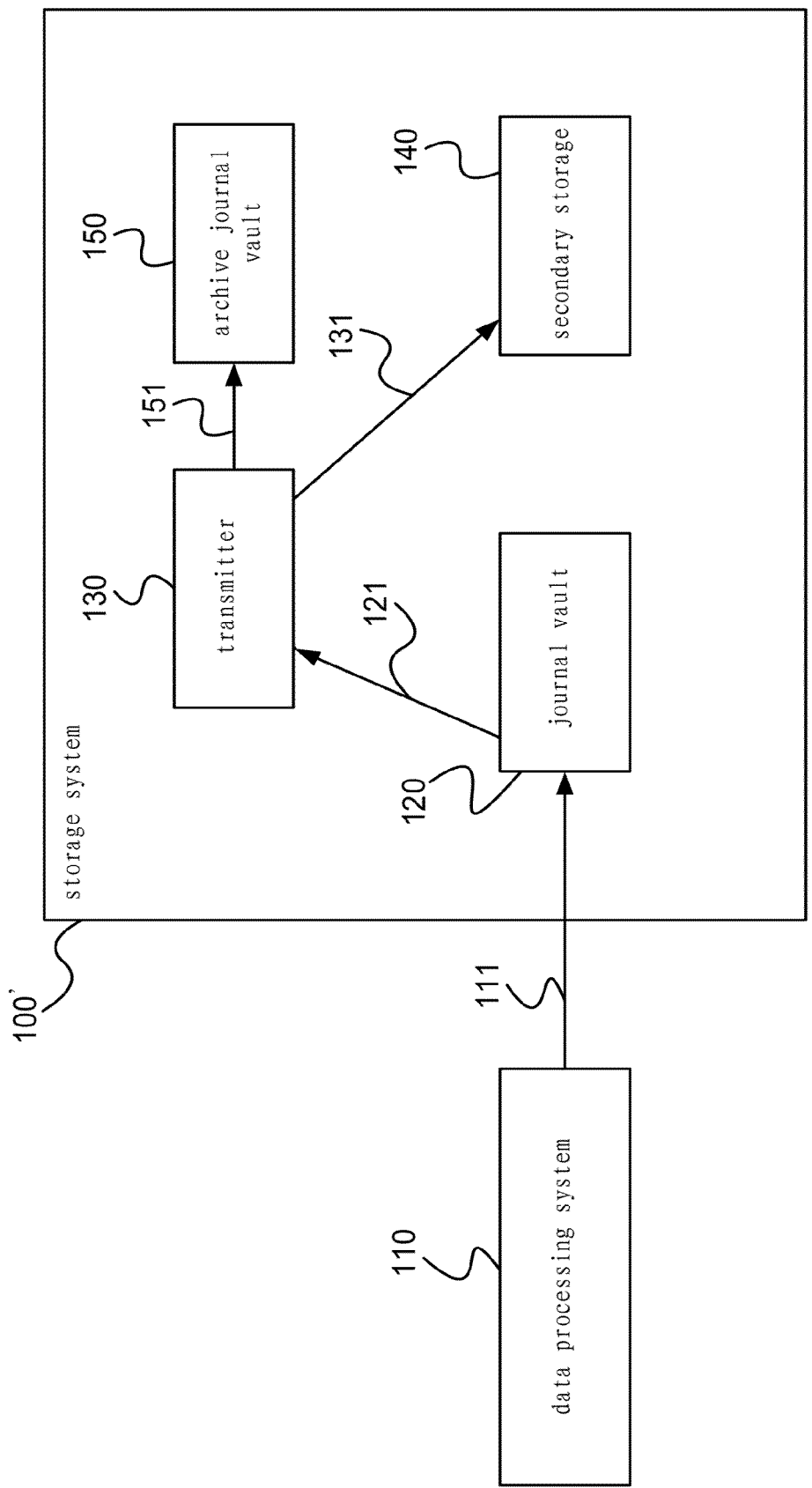
FIG. 2 is a block diagram showing a data storage system according to another embodiment of the present invention.

FIG. 2 shows a data storage system 100' according to another embodiment of the present invention. The embodiment differs from that shown in FIG. 1 in that it further includes an archive journal vault 150. According to this embodiment, the transmitter 130 will send (as indicated by arrow 151) the received journal to the archive journal vault 150 at the same time as sending it to the secondary storage 140. In addition to serving as a long term archive of the journal, the archive journal vault 150 can also implement a continuous data protection function, enabling the find of data status at any time point.

Figure 3:
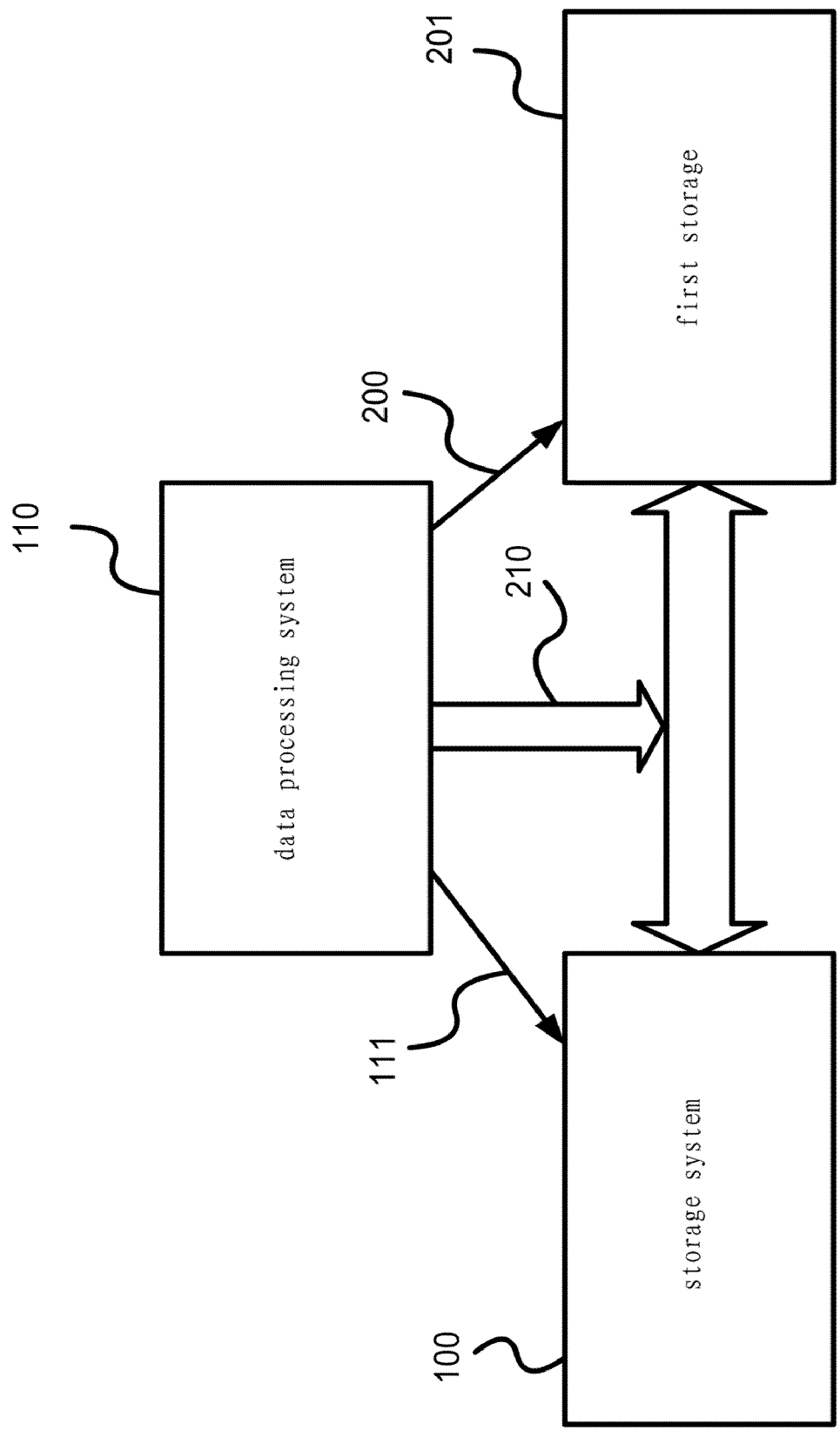
FIG. 3 is a schematic diagram illustrating how a data storage system is severed as a backup system according to one embodiment of the present invention.

FIG. 3 is a schematic diagram illustrating how a data storage system is severed as a backup system according to one embodiment of the present invention, which illustrates one application of the present invention to a backup system. The data processing system 110 is connected with the first storage 219 directly or through optical fiber/IP/iSCSI (as indicated by line 200), and is also connected with a storage system 100 (as indicated by arrow 111). The structure of the storage system 100 is as shown in FIG. 1, and the duplicate description thereof is omitted here. A mirror relationship 210 is established between the local magnetic disk 201 and the storage system 100, and any writing of data into the first storage 200 of the data processing system 110 will cause the writing into the storage system 100 by journaling at the same time. As shown in FIG. 1, incoming data will be journaled into the journal vault 130, and will be stored finally into the secondary storage 140 of the storage system 100. Since the combination mode of both a storage of journal vault 120 and the secondary storage 140 is applied, the performance of writing the backup mirror data into storage system 100 is relatively faster as compared with the conventional backup manner in which the magnetic disk data should be read out first and then written into the backup system.

Figure 4:
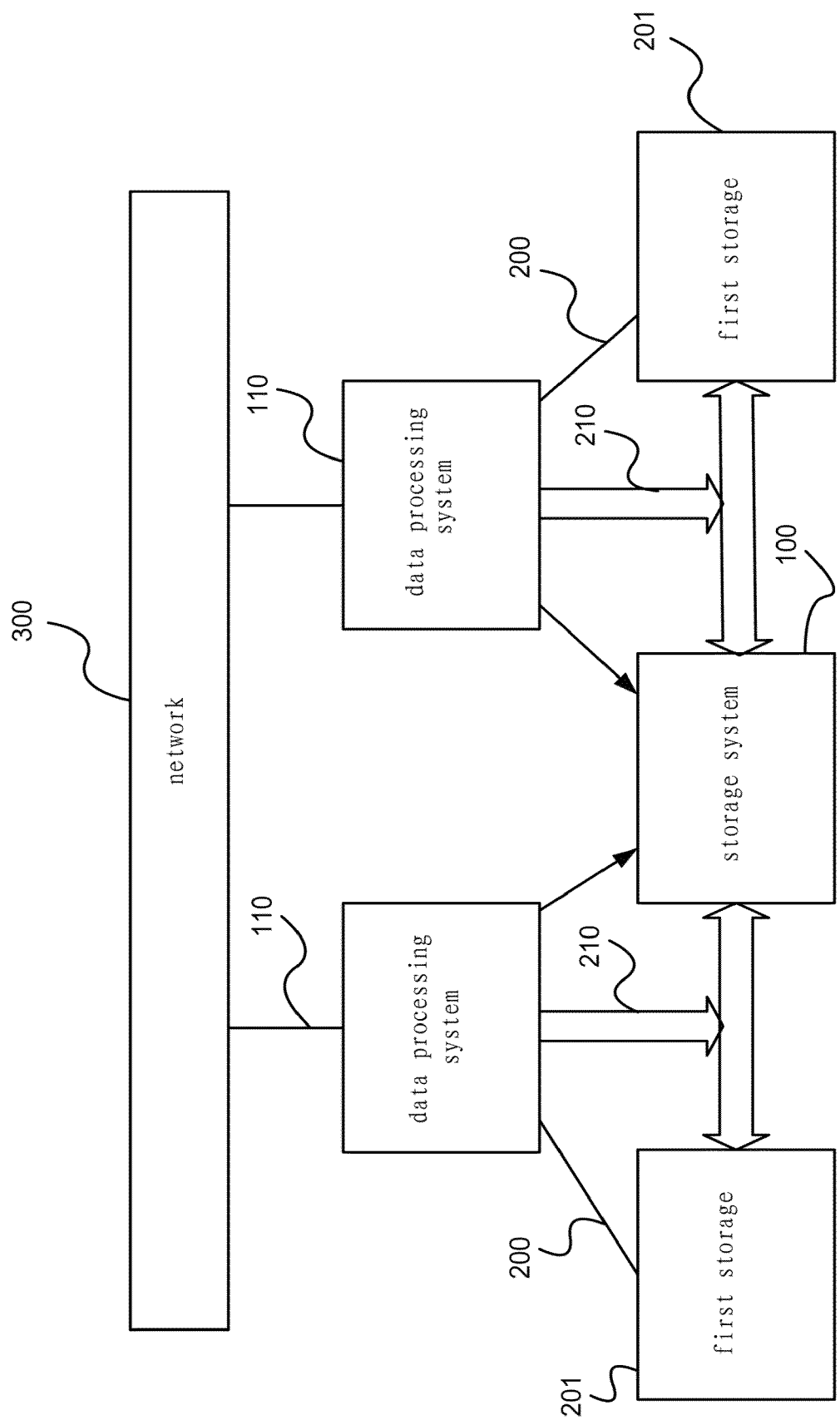
FIG. 4 is a schematic diagram illustrating how a data storage system is severed as a concentrative backup system for a plurality of production systems according to one embodiment of the present invention.

FIG. 4 is a schematic diagram illustrating how a data storage system is served as a concentrative backup system for a plurality of production systems according to one embodiment of the present invention, which illustrates an extension of applying the storage system of the present invention shown in FIG. 2 to backup system. A plurality of data processing systems 110 are connected and communicate with each other through a network 300. Each of the data processing systems 110 can be connected with the storage system 100 in the manner shown in FIG. 3 (as indicated by arrow 111), and data are all mirrored into the storage system 100, forming a concentrative backup application with the writing operation enhanced. In this embodiment, a plurality of journal vaults exist in the storage system 100, and the plurality of journal vaults are corresponding mirrored local storages of the plurality of data processing systems respectively.

Due to the enhanced write operation function, a production system in which the manner of a journal vault is applied contributes to the improvement of performance in the backup application, which becomes a "backup mode" of the present system. When the storage of the production system fails and it needs to take the backup storage into use, the functions of journal vault 120, transmitter 130 and so on in the present system can be stopped and the production system can choose to read data from and write data into the second storage directly. In this work mode, the present system is referred as in a "production mode". A "production mode" means stop "enhancing write function" and becomes back to the mode of normal low performance storage.

The application of the present invention is platform-independent, and any data processing system 110 can adopt the present invention, as long as it can establish a connection with storage system 100 by any approach.

Figure 5:
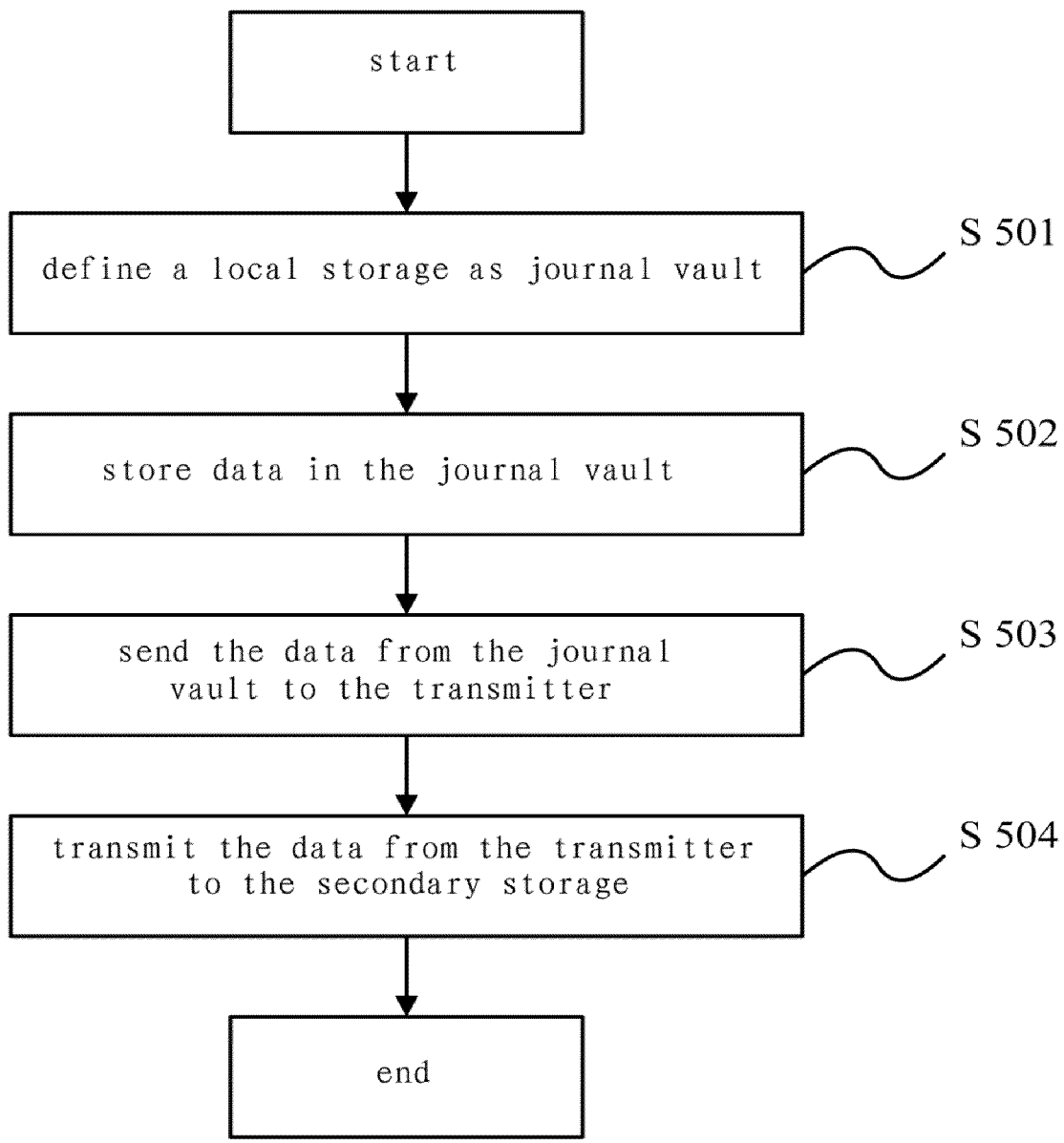
FIG. 5 is a flow chart showing a data storage method according to one embodiment of the present invention.

FIG. 5 is a flow chart showing a data storage method according to one embodiment of the present invention. A data storing method for a data processing system comprises: step 501 of defining a local storage of the data processing system which can be new added, existing or virtual, as a journal vault; step 502 of storing data in the journal vault by journaling; step 503 of transmitting the data from the journal vault to the transmitter; and step 504 of transmitting the data from the transmitter to the secondary storage.

According to another embodiment of the present invention, the local storage is a storage device that can be accessed directly by an operation system of the data processing system, and comprises at least one of USB disk, floppy disk, solid magnetic disk, complex flash disk, locally connected hard disk, external hard disk, remote magnetic disc and memory space.

According to another embodiment of the present invention, wherein the data processing system is connected with the journal vault through a fiber channel, SATA, SAS, SCSI, iSCSI or IP.

According to another embodiment of the present invention, the journal records writing of disk data to the data processing system, wherein a position where the data is written and content thereof are recorded sequentially.

According to another embodiment of the present invention, the transmitter is located in the data processing system or is located in another data processing system, and is for receiving, transmitting and applying the journal to the secondary storage.

According to another embodiment of the present invention, the transmitter applies, continuously or periodically, the journal from the journal vault to the secondary storage.

According to another embodiment of the present invention, in the operating of the transmitter, one or more operations of data compression, data encryption and deleting of duplicate data are performed.

According to another embodiment of the present invention, the transmitter also sends the received journal to an archive journal vault, and the archive journal vault stores the journal for a long term, and performs continuous data protection.

According to another embodiment of the present invention, the transmitter periodically deletes the journal in the journal vault that has been applied to the secondary storage.

According to another embodiment of the present invention, the secondary storage supports a snapshot function.

According to another embodiment of the present invention, the journal vault records writing of disk data for a plurality of data processing systems so that data of a plurality of a first storage is concentratively backuped in the secondary storage.

The present invention enhances the writing performance of a low performance data storage system by adding the structure of the journal vault and the transmitter.

Further, in a case where the present invention is applied to a backup system, since the writing performance of the backup system is enhanced and writing operations occupies most work time of the backup system, the performance of the whole backup system can be improved significantly. Also, the backup system can be extended to a remote site by simple deployments and setups.

The present invention can provide a better protection for data by providing a secondary mirror of a storage of a production system in the manner of journaling. The advantages of the present invention comprises: 1. providing a better data protection: the data loss equals to 0 (RPO=0); 2. saving cost: a device for a secondary storage only needs to satisfy a relatively low performance requirement; 3. high usability: once the production system storage fails, the storage system of the present invention can be switched to "production mode" and service resumes to be provided with the shortest downtime.

Although some embodiments of the present invention have been shown and described with reference to the accompanying drawings, those skilled in the art should understand that various changes and modifications can be made to the embodiments without departing the principles and spirits of the present invention and they still fall into the scope of claims and the equivalent thereof.

What is claimed is:

1. A data storage method for a data processing system, the data storage method using a data storage system which includes a journal vault, a transmitter, and a secondary storage, wherein the data processing system has a first storage and a mirror relationship between the first storage and the secondary storage is established for a backup, the data storage method comprising:

removably connecting the journal vault to the data processing system as a local storage of the data processing system, wherein the local storage is a storage device that can be accessed directly by an operation system of the data processing system, and that is selected from the group consisting of USB disk, floppy disk, solid magnetic disk, complex flash disk, locally connected hard disk, external hard disk, remote magnetic disc and memory space, wherein the data storage system consists of the journal vault, the transmitter, and the secondary storage;

storing data directly from the first storage of the data processing system in the journal vault by journaling the complete contents of the data into smaller volumes of the data at the time when the data is written into the first storage;

sending the data from the journal vault directly to the transmitter; and transmitting the data from the transmitter to the secondary storage, wherein the secondary storage is a low performance storage compared with the first storage.

2. The method according to claim 1, wherein the data processing system is connected with the journal vault through a fiber channel, SATA, SAS, SCSI, iSCSI or IP.

3. The method according to claim 1, wherein the journal records writing of disk data to the data processing system, wherein a position where the data is written and content thereof are recorded sequentially.

4. The method according to claim 1, wherein the transmitter is located in the data processing system or is located in another data processing system, and is for receiving, transmitting and applying the journal to the secondary storage.

5. The method according to claim 1, wherein the transmitter applies, continuously or periodically, the journal from the journal vault to the secondary storage.

6. The method according to claim 1, wherein the transmitter is connected with the journal vault through a fiber channel, SATA, SAS, SCSI, iSCSI or IP and during the operating of the transmitter, one or more operations of data compression, data encryption and deleting of duplicate data are performed.

7. The method according to claim 1, wherein the transmitter also sends the received journal to an archive journal vault, and the archive journal vault stores the journal for a long term, and performs continuous data protection.

8. The method according to claim 1, wherein the transmitter periodically deletes the journal in the journal vault that has been applied to the secondary storage.

9. The method according to claim 1, wherein the secondary storage supports a snapshot function.

10. The method according to claim 1, wherein the method supports more than one data processing systems simultaneously.

11. A data storage system for a data processing system, comprising:

a journal vault, which is removably connected to the data processing system as a local storage of the data processing system, and stores data directly from a first storage of the production system by journaling the data at the time when the data is written into the first storage;

a transmitter for receiving the data directly from the journal vault; and a secondary storage for receiving and storing the data transmitted from the transmitter, wherein the local storage is a storage device that can be accessed directly by an operation system of the data processing system, and that is selected from the group consisting of USB disk, floppy disk, solid magnetic disk, complex flash disk, locally connected hard disk, external hard disk, remote magnetic disc and memory space, and wherein the secondary storage is a low performance storage compared with the first storage of the data processing system, and wherein the data storage system consists of the journal vault, the transmitter, and the secondary storage.

12. The data storage system according to claim 11, wherein the data processing system is connected with the journal vault through a fiber channel, SATA, SAS, SCSI, iSCSI or IP.

13. The data storage system according to claim 11, wherein the journal records writing of disk data to the data processing system, wherein a position where the data is written and content thereof are recorded sequentially.

14. The data storage system according to claim 11, wherein the transmitter is located in the data processing system or is located in another data processing system, and is for receiving, transmitting and applying the journal to the secondary storage.

15. The data storage system according to claim 11, wherein the transmitter applies, continuously or periodically, the journal from the journal vault to the secondary storage.

16. The data storage system according to claim 11, wherein the transmitter is connected with the journal vault through a fiber channel, SATA, SAS, SCSI, iSCSI or IP and in the transmitter, one or more operations of data compression, data encryption and deleting of duplicate data are performed.

17. The data storage system according to claim 11, further comprising an archive journal vault, and the transmitter also sends the received journal to the archive journal vault, and the archive journal vault stores the journal for a long term, and performs continuous data protection.

18. The data storage system according to claim 11, wherein the transmitter periodically deletes the journal in the journal vault that has been applied to the secondary storage.

19. The data storage system according to claim 11, the secondary storage supports a snapshot function.

20. The data storage system according to claim 11, the data storage system supports more than one data processing systems simultaneously.

21. A data storage system, comprising:

a production system including a first storage;

a backup system including a secondary storage, a mirror relationship between the first storage and the secondary storage being established for a backup, the backup system further comprising:

a journal vault, which is removably connected to the data processing system as a local storage of the data processing system, and stores data directly from the first storage by journaling at the time when the data is written into the first storage; and a transmitter for receiving the data directly from the journal vault;

wherein the secondary storage receives and stores the data transmitted from the transmitter as the backup of the first storage, wherein the local storage is a storage device that can be accessed directly by an operation system of the data processing system, and that is selected from the group consisting of USB disk, floppy disk, solid magnetic disk, complex flash disk, locally connected hard disk, external hard disk, remote magnetic disc and memory space, and wherein the secondary storage is a low performance storage compared with the local storage and the first storage, and wherein the data storage system consists of the journal vault, the transmitter, and the secondary storage.

22. The data storage system according to claim 21, wherein the journal vault records writing of data to respective first storages of a plurality of data processing systems so that the data of the respective first storages is concentratively backuped in the secondary storage.

23. The data storage system according to claim 21, when the first storage fails, the backup system is switched to the production system.

24. The data storage system according to claim 22, when the first storage fails, the backup system is switched to the production system.

* * * * *